United States Patent
Kishi

(10) Patent No.: US 11,675,557 B2
(45) Date of Patent: Jun. 13, 2023

(54) IMAGE FORMING APPARATUS AND IMAGE FORMING SYSTEM

(71) Applicant: KYOCERA Document Solutions Inc., Osaka (JP)

(72) Inventor: Yoshitaka Kishi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/570,529

(22) Filed: Jan. 7, 2022

(65) Prior Publication Data

US 2022/0222023 A1     Jul. 14, 2022

(30) Foreign Application Priority Data

Jan. 14, 2021    (JP) .............................. JP2021-003903

(51) Int. Cl.
*G06F 3/12*      (2006.01)
*H04N 1/60*      (2006.01)

(52) U.S. Cl.
CPC .......... *G06F 3/1257* (2013.01); *G06F 3/1205* (2013.01); *G06F 3/1208* (2013.01); *G06F 3/1225* (2013.01); *G06F 3/1253* (2013.01); *H04N 1/603* (2013.01)

(58) Field of Classification Search
CPC .... G06F 3/1257; G06F 3/1205; G06F 3/1208; G06F 3/1225; G06F 3/1253; H04N 1/603
USPC ........................................................ 358/1.9
See application file for complete search history.

(56) References Cited

U.S. PATENT DOCUMENTS

| | | | |
|---|---|---|---|
| 7,557,950 B2 * | 7/2009 | Hatta ..................... | H04N 1/047 358/1.9 |
| 2017/0221449 A1 * | 8/2017 | Drazek .................. | G09G 5/005 |
| 2019/0297226 A1 * | 9/2019 | Ohkubo ............. | H04N 1/00045 |

FOREIGN PATENT DOCUMENTS

| | | |
|---|---|---|
| JP | 2004-015219 | 1/2004 |
| JP | 2004-037525 | 2/2004 |

* cited by examiner

*Primary Examiner* — Darryl V Dottin
(74) *Attorney, Agent, or Firm* — Lex IP Meister, PLLC

(57) ABSTRACT

An image forming apparatus includes: a printing device which prints an image using a color material consumable; a storage device which stores one or more color profiles for the printing device; and a profile management unit which selects a color profile usable for printing the image from the one or more color profiles stored in the storage device. The color profile stored in the storage device has version information of color material consumables corresponding to the color profile. The profile management unit acquires version information of the color material consumable mounted on the printing device at present, and selects a color profile having the same version information as the acquired version information, as the color profile usable for printing the image.

5 Claims, 3 Drawing Sheets

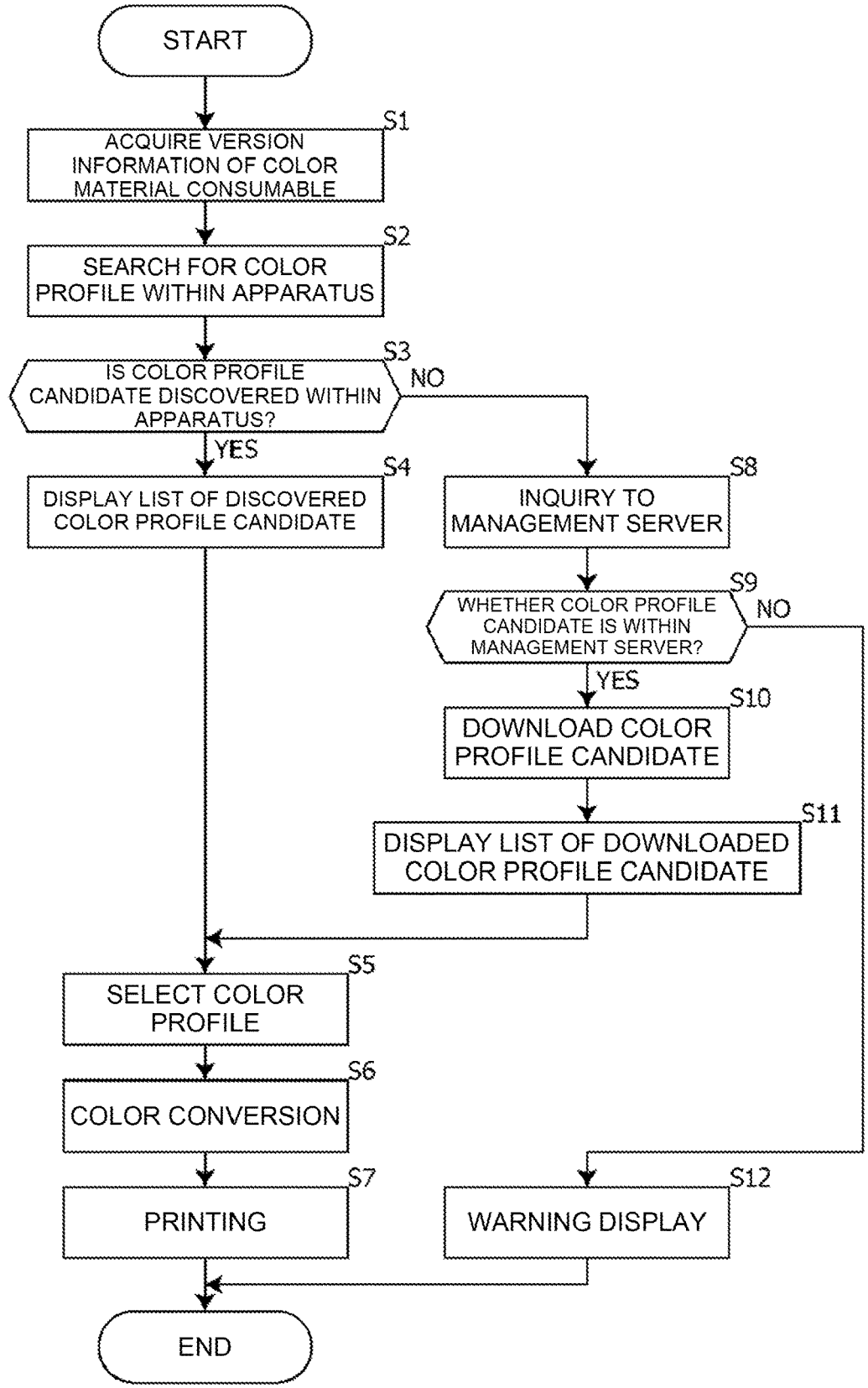

IMAGE FORMING APPARATUS AND IMAGE FORMING SYSTEM

INCORPORATION BY REFERENCE

This application is based upon and claims the benefit of priority from the corresponding Japanese Patent Application No. 2021-003903 filed on Jan. 14, 2021, the entire contents of which are incorporated herein by reference.

BACKGROUND

The present disclosure relates to an image forming apparatus and an image forming system.

In color conversion in a typical image forming apparatus or the like, a color profile such as an International Color Consortium (ICC) profile is used. Thus, by using the color profile corresponding to the device-specific color space, appropriate color conversion is performed for the device. The ICC profile has a tag table including a tag and element data associated with the tag.

Another typical image forming apparatus switches the color conversion mode based on the attribute information of the ICC profile.

As described above, by preparing a color profile corresponding to a certain device type, appropriate color conversion can be performed for the device type.

However, in the case where a plurality of versions of the color material consumables having different color reproduction characteristics from each other are mixed and distributed due to the improvement of the color materials such as ink and toner and the change of specifications, it is possible that appropriate color conversion is not performed depending on the version of the color material consumables actually used.

The present disclosure provides an image forming apparatus and an image forming system in which color conversion based on a color profile is more appropriately performed.

SUMMARY

The image forming apparatus according to the present disclosure includes: a printing device printing an image using a color material consumable; a storage device storing one or more color profiles for the printing device; and a profile management unit selecting a color profile usable for printing the image from the color profiles stored in the storage device. The color profile stored in the storage device has version information of color material consumables corresponding to the color profile. The profile management unit acquires version information of a color material consumable mounted on the printing device at present, and selects a color profile having the same version information as the acquired version information, as a color profile usable for printing the image.

The image forming system according to the present disclosure includes an image forming apparatus and a management server. The image forming apparatus includes: a communication device which can communicate with a management server; a printing device which prints an image using a color material consumable; a storage device which stores one or more color profiles for the printing device; and a profile management unit which selects a color profile usable for printing the image from the color profiles stored in the storage device. The color profile stored in the storage device has version information of a color material consumable corresponding to the color profile. The profile management unit acquires version information of a color material consumable mounted on the printing device at the present time, selects a color profile having the same version information as the acquired version information, as a color profile usable for printing the image, when no color profile usable for printing the image is discovered in the storage device, (a) inquires of the management server by using the communication device whether a color profile having the same version information as the acquired version information can be downloaded, (b) when a color profile having the same version information as the acquired version information can be downloaded, downloads the color profile having the same version information as the acquired version information, from the management server, and (c) selects the downloaded color profile as a color profile usable for printing the image.

BRIEF DESCRIPTION OF THE FIGURES

FIG. 3 is a flowchart for explaining the operation of the image forming apparatus 1-$i$ in FIG. 1.

DETAILED DESCRIPTION

Embodiments of the present disclosure will be described below with reference to the drawings.

Figure 1:
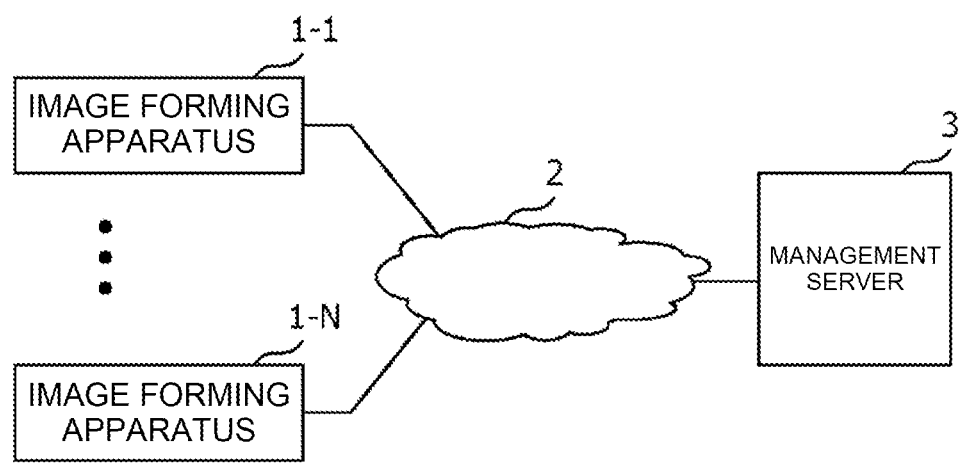
FIG. 1 is a block diagram showing a configuration of an image forming system including an image forming apparatus according to an embodiment of the present disclosure.

FIG. 1 is a block diagram showing a configuration of an image forming system including an image forming apparatus according to an embodiment of the present disclosure. The system shown in FIG. 1 comprises one or more image forming apparatuses 1-1 to 1-N, each image forming apparatus 1-$i$ being connected to a network 2 (Local Area Network (LAN), such as an intranet, or Wide Area Network (WAN), such as the Internet). The system further includes a management server 3 connected to the network 2.

Each image forming apparatus 1-$i$ has a function of performing color conversion in accordance with a color profile matching the output color characteristics of the apparatus such as a printer or a multifunction device, receives a job request such as a print job request, performs color conversion on an image (image data) designated by the job request, and prints the image.

The management server 3 is a server having a function of providing a color profile to each of the image forming apparatuses 1-$i$ in response to a request.

Figure 2:
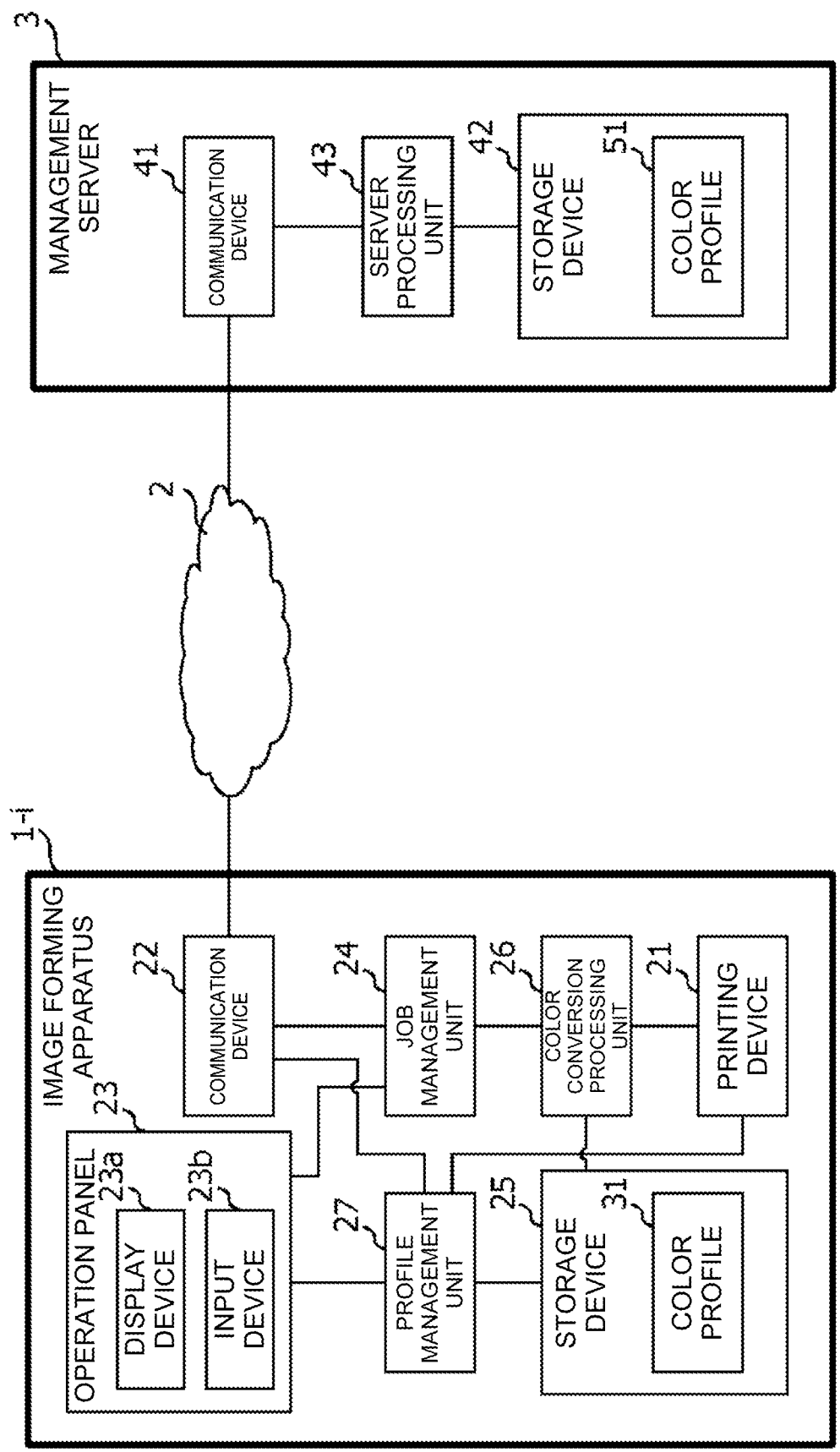
FIG. 2 is a block diagram showing the configuration of the image forming apparatus 1-$i$ and the management server 3 according to the embodiment of the present disclosure.

FIG. 2 is a block diagram showing the configuration of the image forming apparatus 1-$i$ and the management server 3 according to the embodiment of the present disclosure. As shown in FIG. 2, each image forming apparatus 1-$i$ includes a printing device 21, a communication device 22, an operation panel 23, a job management unit 24, a storage device 25, a color conversion processing unit 26, and a profile management unit 27.

The printing device 21 prints an image designated by a job request on a print sheet, by a predetermined printing method such as an electrophotographic method. The printing device 21 prints an image by using color material consumables (more specifically, ink cartridges, toner cartridges, etc.).

The communication device 22 is, for example, a network interface connected to the network 2 and is an internal device capable of data communication with other devices (management server 3, other image forming apparatus 1-*j*, etc.) connected to the network 2.

The operation panel 23 is disposed on the surface of the housing of the image forming apparatus 1-*i* and includes a display device 23*a* for displaying an operation screen to a user and an input device 23*b* for detecting the user's operation. As the display device 23*a*, for example, a liquid crystal display is used. As the input device 23*b*, a key switch, a touch panel, or the like, is used.

When a job request of a job (print jobs, copy jobs, etc.) using a printing device 21 is received, the job management unit 24 makes a color conversion processing unit 26 execute color conversion using the color profile selected by the profile management unit 27, and makes the printing device 21 print an image to be printed after the color conversion.

The storage device 25 can store various data and programs. As the storage device 25, a nonvolatile mass storage medium such as a nonvolatile memory or a hard disk drive is used. The storage device 25 stores one or a plurality of color profiles 31 for the image forming apparatus 1-*i* (that is, the printing device 21).

Each color profile 31 has color conversion characteristic data and version information of a color material consumable (toner, ink, etc.) corresponding to (matching) the color profile 31.

Each color profile 31 has a color conversion characteristic set corresponding to the color reproduction characteristic by the color material of the color material consumables of the version information described in the color profile 31. In this embodiment, the color profile 31 is an ICC profile and the version information described above is tagged element data.

The color profile includes a color profile for color conversion from the device-independent color space to the device-dependent color space of the printing device 21, a color profile (device link profile) for color conversion from the device-dependent color space of an image input device such as an image reading apparatus (not shown) to the device-dependent color space of the printing device 21, and the like.

A color conversion processing unit 26 executes color conversion of an image to be printed (that is, the image specified in the job request) according to the color profile specified by the job management unit 24. Here, color conversion is performed from the color space (RGB color space, CIELAB color space, etc.) of the image to be printed to the color space (in this case, the CMYK color space) of the device (printing device 21).

The profile management unit 27 is a processing unit managing the color profile 31. The profile management unit 27 selects a color profile (hereinafter referred to as color profile candidates) usable for printing the target image from the color profiles 31 stored in the storage device 25.

Specifically, the profile management unit 27 acquires version information of the color material consumables mounted on the printing device 21 at the present time, and selects a color profile 31 having the same version information as the acquired version information, as a color profile candidate.

For example, the profile management unit 27 acquires version information by reading version information from an IC chip fixed to a color material consumable or by reading version information previously registered by a user or the like, from the storage device 25.

In this embodiment, when no color profile candidate is discovered in the storage device 25 (that is, if no color profile 31 is discovered that matches the current color material consumable), the profile management unit 27 (*a*) inquires of the management server 3 by using the communication device 22 whether or not the color profile 51 having the same version information as the acquired version information can be downloaded, (*b*) if the color profile 51 having the same version information as the acquired version information can be downloaded, downloads the color profile 51 from the management server 3 and stores the color profile 51 in the storage device 25, and (*c*) selects the downloaded color profile 51 as the color profile candidate.

In this embodiment, the profile management unit 27 (*a*) displays a list of selected color profiles on the display device 23*a*, and (*b*) selects color profile candidates from the list according to the user operation detected by the input device 23*b*.

The above user interface on which the profile list is displayed is an operation panel 23 (display device 23*a*) of the image forming apparatus 1-*i* or a host device (display device of host device). For example, in the case of a job request for a print job, the profile management unit 27 uses a device driver to display the profile list on the host device as the above user interface. For example, in the case of a job request for a copy job, the profile management unit 27 displays a profile list on the operation panel 23 as the above user interface.

The job management unit 24, the color conversion processing unit 26, and the profile management unit 27 are implemented by executing software processing and/or hardware processing using a computer and/or an Application Specific Integrated Circuit (ASIC). The computer is provided with a Central Processing Unit (CPU), a Read Only Memory (ROM), a Random Access Memory (RAM), etc., loads a program from the ROM, the storage device 25, etc., to the RAM, and executes the program by the CPU, thereby operating as a processing unit thereof.

As shown in FIG. 2, the management server 3 includes a communication device 41 similar to the communication device 22, a storage device 42 similar to the storage device 25, and a server processing unit 43.

The storage device 42 stores downloadable color profiles 51 for the image forming apparatuses 1-1 to 1-N. Each color profile 51 is similar to the color profile 31 and has version information of a color material consumable (toner, ink, etc.) matching the color profile 51 together with color conversion characteristic data.

The server processing unit 43 (*a*) receives an inquiry from the image forming apparatus 1-*i* by using the communication device 41, (*b*) when receiving the inquiry, (in the same manner as the profile management unit 27) searches for a color profile 51 that matches the version information (and the device type) specified by the inquiry among the color profiles 51 stored in the storage device 42, and (*c*) transmits the search result (whether or not there is a color profile 51 that matches) to the image forming apparatus 1-*i* as the inquiry source by using the communication device 41.

The server processing unit 43 is implemented by executing software processing and/or hardware processing using a computer and/or an ASIC. The computer includes a CPU, a ROM, a RAM, etc., loads a program from the ROM, the storage device 42, etc., into the RAM, and executes the program by the CPU, thereby operating as the processing unit.

Next, the operation of the image forming apparatus 1-*i* will be described. FIG. 3 is a flowchart for explaining the operation of the image forming apparatus 1-*i* in FIG. 1.

When the job management unit 24 receives the job request, the profile management unit 27 acquires version information of the color material consumables currently mounted on the printing device 21 (step S1), and searches for the color profile 31 within the image forming apparatus 1-*i* (that is, in the storage device 25) using the acquired version information as a key as described above (step S2).

Then, the profile management unit 27 determines whether or not there is at least one discovered color profile 31 (color profile candidate) (step S3), and if there is at least one discovered color profile 31 (color profile candidate), displays the list of discovered color profiles 31 on the display device 23*a* or the like (step S4).

The user confirms the displayed list, selects a desired color profile 31 as a color profile to be used for color conversion of an image to be printed, and performs a user operation for designating the selected color profile to an input device 23*b* or the like.

The profile management unit 27 specifies the color profile designated by the user based on the user operation detected by the input device 23*b* or the like, and selects the color profile (step S5). Then, the job management unit 24 causes the color conversion processing unit 26 to perform color conversion using the color profile selected by the profile management unit 27 in this manner (step S6), and causes the printing device 21 to print the image to be printed after the color conversion (step S7).

On the other hand, when none of the color profiles 31 (color profile candidates) are discovered, the profile management unit 27 transmits an inquiry of the color profile specifying the acquired version information, to the management server 3 by the communication device 22 (step S8).

When receiving the inquiry by the communication device 41, the server processing unit 43 of the management server 3 searches for the color profile 51 in the storage device 42 by using the designated version information as a key, and transmits the search result to the image forming apparatus 1-*i* by the communication device 41.

When the profile management unit receives the search result after transmitting the above inquiry, the profile management unit 27 determines, based on the search result, whether or not a color profile 51 (color profile candidate) matching the present color material consumable exists in the management server 3 (step S9).

When a color profile candidate matching the color material consumables at the present time exists in the management server 3, the profile management unit 27 uses the communication device 22 to download the color profile 51 matching the color material consumables at the present time according to a predetermined protocol (step S10), and displays the list of the downloaded color profiles 51 on the display device 23*a* or the like (step S11).

Thereafter, when the above user operation is detected by the input device 23*b* or the like, the profile management unit 27 specifies the color profile designated by the user based on the user operation, and selects the color profile (step S5). Then, the job management unit 24 causes the color conversion processing unit 26 to perform color conversion using the color profile selected by the profile management unit 27 in this manner (step S6), and causes the printing device 21 to print the image to be printed after the color conversion (step S7).

On the other hand, if it is determined in step S9 that the color profile 51 (color profile candidate) matching the present color material consumables does not exist in the management server 3 based on the above search result, the profile management unit 27 displays a warning message to that effect on the display device 23*a* or the like (step S12), and ends the job without executing color conversion and printing.

As described above, according to the above embodiment, the printing device 21 prints an image using the color material consumables. The storage device 25 stores one or more color profiles 31 for the printing device 21. A profile management unit 27 selects a color profile usable for printing an image from a color profile 31 stored in a storage device 25. The color profile 31 stored in the storage device 25 has version information of the color material consumables corresponding to the color profile 31, and the profile management unit 27 acquires version information of the color material consumables mounted on the printing device 21 at the present time, and selects the color profile 31 having the same version information as the acquired version information, as a color profile usable for printing an image.

Thus, since the color profile 31 suitable for the color reproduction characteristic of the color material of the color material consumables mounted at the present time is selected, color conversion based on the color profile 31 is performed more appropriately.

Various changes and modifications to the embodiments described above will be apparent to those skilled in the art. Such modifications and modifications may be made without departing from the object and scope of the subject matter and without diminishing the intended advantage. That is, such changes and modifications are intended to be within the scope of the claims.

For example, in the above embodiment, the management server 3 may be built in any of the image forming apparatuses 1-1 to 1-N.

Further, in the above embodiment, only when there is no color profile 31 that matches the current version information of the color material consumables in the image forming apparatus 1-*i*, the image forming apparatus 1-*i* downloads the color profile 51 that matches the current version information of the color material consumables from the management server 3, but instead, the image forming apparatus 1-*i* may download the color profile 51 that matches the current version information of the color material consumables from the management server 3 regardless of whether there is a color profile 31 that matches the current version information of the color material consumables in the image forming apparatus 1-*i*.

The present disclosure is applicable to an image forming apparatus such as a printer, a multifunction device, and the like.

What is claimed is:

1. An image forming apparatus comprising:
    a printer that prints an image using a color material consumable mounted thereon;
    a storage that stores one or more color profiles for the printer; and
    a profile manager that selects a color profile usable for the printer from the one or more color profiles stored in the storage, wherein
    the color profile stored in the storage includes version information of a color material consumable and has a color conversion characteristic set correspondingly to color reproduction characteristic by a color material of the color material consumable of the version information included in the color profile, and
    the profile manager acquires the version information of the color material consumable mounted currently on the printer, and selects the color profile stored in the storage, in accordance with the acquired version information and the version information included in the one or more color profiles stored in the storage, the selected color profile including the same version information as the acquired version information.

2. The image forming apparatus according to claim 1, further comprising a communicator that communicates with a management server,
wherein when the color profile usable for printing the image by the printer is not discovered in the storage, the profile manager (a) inquires of the management server by using the communicator whether or not the color profile including the same version information as the acquired version information can be downloaded, (b) when the color profile including the same version information as the acquired version information can be downloaded, the profile manager downloads the color profile including the same version information as the acquired version information, from the management server, and (c) selects the downloaded color profile as the color profile usable for the printer.

3. The image forming apparatus according to claim 1, further comprising a display device that displays an operation screen to a user, and an input device that detects the user's operation,
wherein the profile manager (a) displays a list of the selected color profiles on the display device, and (b) selects a color profile to be used for printing the image by the printer from the list according to the user's operation detected by the input device.

4. The image forming apparatus according to claim 1, wherein
the color profile is an International Color Consortium (ICC) profile, and
the version information is included in tagged element data of the color profile.

5. An image forming system comprising an image forming apparatus and a management server,
the image forming apparatus comprising:
a communicator that communicates with the management server,
a printer that prints an image using a color material consumable mounted thereon;
a storage that stores one or more color profiles for the printer; and
a profile manager that selects a color profile usable for the printer from the one or more color profiles stored in the storage, wherein
the color profile stored in the storage includes version information of a color material consumable and has a color conversion characteristic set correspondingly to color reproduction characteristic by a color material of the color material consumable of the version information included in the color profile,
the profile manager acquires version information of a color material consumable mounted currently on the printer, and selects a color profile stored in the storage, in accordance with the acquired version information and the version information included in the one or more color profiles stored in the storage, the selected color profile including the same version information as the acquired version information, and
when the profile manager does not select the color profile stored in the storage, the profile manager (a) inquires of the management server by using the communicator whether or not the color profile including the same version information as the acquired version information can be downloaded, (b) when the color profile including the same version information as the acquired version information can be downloaded, the profile manager downloads the color profile including the same version information as the acquired version information, from the management server, and (c) selects the downloaded color profile as the color profile usable for the printer.

* * * * *